United States Patent Office 3,288,560
Patented Nov. 29, 1966

3,288,560
PREPARATION OF AMMONIUM PERCHLORATE
William A. Gale, Whittier, and William T. Reburn, Trona, Calif., assignors to American Potash & Chemical Corporation, Los Angeles, Calif., a corporation of Delaware
Filed July 23, 1963, Ser. No. 296,995
8 Claims. (Cl. 23—85)

The present invention relates to new and useful methods for the preparation of inorganic compounds. More particularly, the present invention relates to the production of very pure ammonium perchlorate.

It is well known that ammonium perchlorate enjoys wide utility as an oxidizer in solid propellant compositions. To be satisfactory for this use, ammonium perchlorate must be extremely pure since even small amounts of impurities have powerful adverse effects upon the performance of a solid propellant containing the ammonium perchlorate as an oxidizer.

Ammonium perchlorate is generally produced by a series of steps which include the electrolysis of an aqueous sodium chloride solution to sodium chlorate, which is in turn electrolytically converted to sodium perchlorate. The sodium perchlorate is then reacted with ammonium and chloride ions to produce ammonium perchlorate and the by-product, sodium chloride.

As an alternative to the step of reacting the sodium perchlorate with ammonium and chloride ions, it has been suggested that the sodium perchlorate might be reacted with ammonia gas in the presence of carbon dioxide, to produce ammonium perchlorate. This alternative procedure has been generally unsuccessful because of the difficulty of separating the resulting sodium bicarbonate from the product, ammonium perchlorate.

The above-described disadvantages are overcome according to the present invention by the provision of an effective amount of sodium carbonate in an aqueous mixture of ammonium perchlorate and sodium bicarbonate, whereby the solubility of sodium bicarbonate in the aqueous mixture is greatly depressed. The recovery of ammonium perchlorate, which is substantially free from sodium bicarbonate, is readily accomplished because of the greatly depressed sodium bicarbonate solubility.

Figure 1:
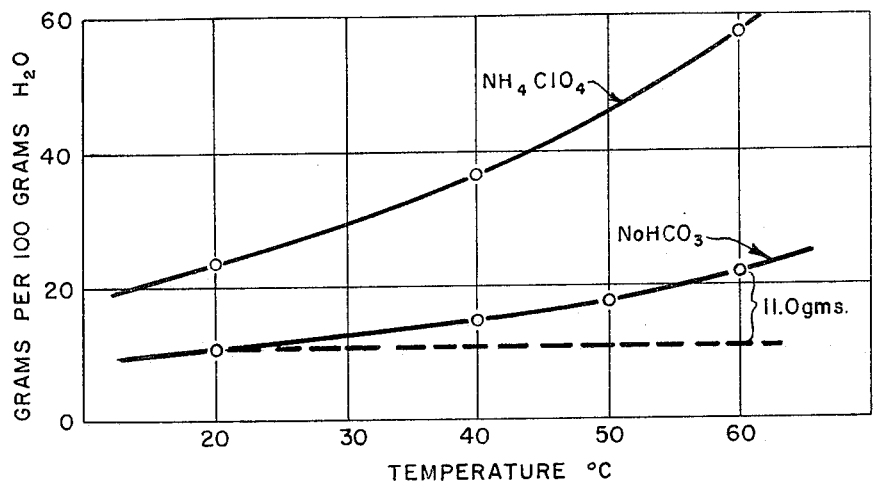
Figure 2:
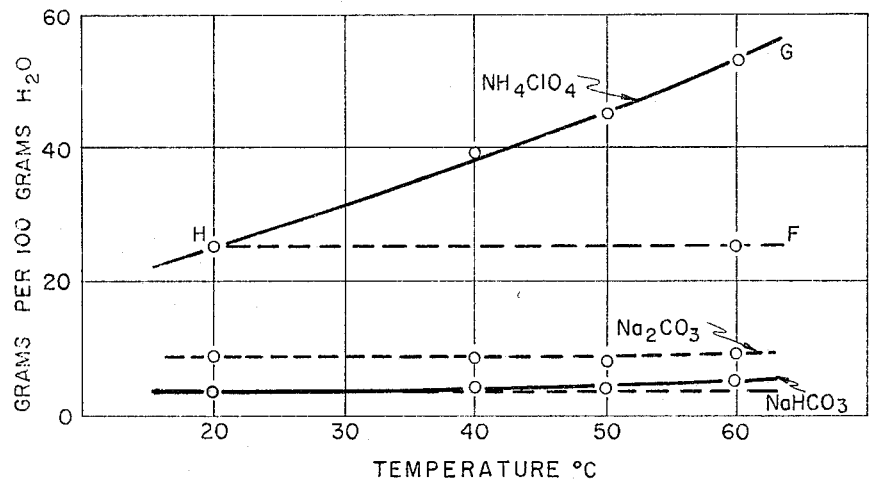

For a more complete understanding of the present invention, reference is made to the following description and the appended drawing in which:

FIG. 1 is a graph illustrating the mutual solubilities in water of a mixture of ammonium perchlorate and sodium bicarbonate at various temperatures; and FIG. 2 is a graph illustrating the mutual solubilities in water of a mixture of ammonium perchlorate and sodium bicarbonate in the presence of 9 grams of dissolved sodium carbonate and 3.5 grams of dissolved sodium perchlorate per each 100 grams of water in the mixture at various temperatures.

Referring specifically to FIG. 1, the maximum amount of ammonium perchlorate which can be dissolved in this mixture of water, ammonium perchlorate and sodium bicarbonate, is indicated by the solid curve labeled $NH_4ClO_4$. The $NH_4ClO_4$ curve indicates the saturation point of this mixture with respect to ammonium perchlorate at temperatures ranging from about 10° C. to about 60° C. Likewise, the solid curve labeled $NaHCO_3$ indicates the maximum amount of sodium bicarbonate that can be dissolved in this mixture. As indicated in this graph, when the quantity of sodium bicarbonate dissolved in this mixture at 20° C. is projected onto a point on the graph at 60° C. and compared with the solubility of this material at 60° C., it is apparent that an additional 11 grams of $NaHCO_3$ for each 100 grams of water can be dissolved when the temperature is raised from 20° C. to 60° C. Conversely, and of great significance in a fractional crystallization operation, 11 grams of $NaHCO_3$ will be precipitated from every 100 grams of water when the temperature of this mixture is lowered from 60° C. to 20° C.

The mutual solubility relationships of ammonium perchlorate and sodium bicarbonate in an aqueous system, illustrated graphically in FIG. 2, are such that a simple complete separation by fractional crystallization is not possible. If, for example, the reaction mixture resulting from the reaction of stoichiometric amounts of sodium perchlorate, ammonia and carbon dioxide formed at 60° C. is cooled to 20° C., the desired ammonium perchlorate product will contain large amounts of sodium bicarbonate. One way to achieve adequate separation of ammonium perchlorate and sodium bicarbonate might be through further processing by other means. This, however, is not an acceptable solution to the problem, since it complicates the process and adds greatly to the expense of the operation.

As is more particularly illustrated in FIG. 2, the addition of a small amount of sodium carbonate to a mixture of ammonium perchlorate and sodium bicarbonate greatly depresses the solubility of the sodium bicarbonate. The broken $Na_2CO_3$ line indicates the quantity of dissolved sodium carbonate in the aqueous mixture. The solid line labeled $NH_4ClO_4$ indicates the solubility limits of ammonium perchlorate in the aqueous mixture. Likewise, the solid $NaHCO_3$ line indicates the solubility limits of sodium bicarbonate in the aqueous mixture.

The presence of sodium carbonate in this aqueous system so greatly depresses the solubility of the sodium bicarbonate that it is possible to separate ammonium perchlorate from sodium bicarbonate by simple conventional fractional crystallization.

The presence of a small amount of dissolved sodium carbonate in the aqueous mixture has very little effect on the solubility of the ammonium perchlorate. The solubility of sodium bicarbonate in such a system is, however, greatly depressed, particularly at higher temperatures. This effect is so pronounced that the solubility of sodium bicarbonate in this system, as shown in FIG. 2, changes very little with a temperature increase from 20 to 60° C.

An additional advantageous effect is obtained by the introduction of a small amount of sodium carbonate into an aqueous mixture of ammonium perchlorate and sodium bicarbonate, in that it is possible to crystallize ammonium perchlorate out of this aqueous medium without forming even the 1 or 2% of solid sodium bicarbonate that would be expected from a consideration of the mutual solubilities of these compounds as shown in FIG. 2.

While this invention is not limited to any theory, it is thought that the change in sodium bicarbonate solubility during cooling is so small, as shown in FIG. 2, that rapid crystallization of the sodium bicarbonate does not take place. Instead, the aqueous mixture tends to remain slightly supersaturated with respect to sodium bicarbonate for a sufficient length of time to permit the ammonium perchlorate crystals to be separated from the liquor before any solid sodium bicarbonate forms. A water wash can be used if desired to remove any entrained sodium bicarbonate from the ammonium perchlorate crystals.

A further beneficial effect attributable to the addition of a small amount of sodium carbonate to the reaction mixture is an appreciable decrease in the vapor pressure of ammonia over the aqueous reaction mixture. Thus, a lower ammonia partial pressure can be used in the ammonia absorption step if a small amount of sodium carbonate is present. Losses of ammonia in the vapor phase are also reduced to a minimum because of this phenomenon.

Another advantage of the present process is that the slope of the NH₄NlO₄ curve is steep enough (see FIG. 2) that a good yield of ammonium perchlorate can be achieved simply by cooling a saturated solution of, for example, the composition of point G in FIG. 2 down to a temperature of 20° C., resulting in the composition of point H. Since simple cooling provides a good yield of product, it is unnecessary to evaporate any water from the mixture unless such a procedure is desired. Since evaporative procedures are generally complex and require a considerable amount of specialized equipment, an evaporation step is generally not used.

The reaction by which ammonium perchlorate is produced according to the present process can be represented by the following equilibrium reaction:

$$NaClO_4 + NH_4HCO_3 \rightleftharpoons NH_4ClO_4 + NaHCO_3$$

At normal temperatures in an aqueous medium, the production of the two salts on the right side of this equation is favored.

Generally, the sodium perchlorate is supplied to the reaction mixture either as a granular solid or as an aqueous solution of sodium perchlorate.

The ammonium bicarbonate can be supplied to the above reaction as a granular solid of ammonium bicarbonate, or it can be produced in situ by the reaction of ammonia and carbon dioxide in the aqueous reaction mixture, or a solution of ammonium bicarbonate can be prepared independently of the reaction mixture and supplied thereto as a solution. The manner in which the ammonium bicarbonate is formed and admixed with the sodium perchlorate is not critical to the present invention. If ammonia and carbon dioxide are added directly to a solution of sodium perchlorate, the reaction may proceed so rapidly or by a different reaction path so that substantially no ammonium bicarbonate is ever formed. Wherever the term "the equivalent of ammonium bicarbonate" is used throughout this specification and in the appended claims, it is intended to include all of these forms of the material including the situation where ammonia and carbon dioxide are added directly to the solution of sodium perchlorate.

The ammonia, if it is used, can be supplied to the reaction mixture as a gas or a liquid, as desired.

The carbon dioxide, if it is used, can be supplied in any form desired, gaseous or solid, or a solution of carbonic acid may serve as the source of carbon dioxide. The equation for the formation of ammonium bicarbonate is as follows:

$$NH_3 + CO_2 + H_2O \rightarrow NH_4HCO_3$$

The amount of sodium carbonate which is effective to depress the solubility of the sodium bicarbonate includes the concentrations of from about 2 grams up to 15 grams or more of sodium carbonate per each 100 grams of water in this mixture. The useful upper limit of sodium carbonate concentration is that at which the liquor reaches saturation with respect to the double salt, trona, i.e., sodium sesquicarbonate ($Na_2CO_3 \cdot NaHCO_3 \cdot 2H_2O$) in the cooling step of the process. The preferred concentration of sodium carbonate is from about 4 to 10 grams of sodium carbonate per each 100 grams of water present in this mixture.

Advantageously, it has been discovered that the presence of an amount of sodium carbonate sufficient to depress the solubility of the sodium bicarbonate in the aqueous mixture has very little effect on the solubility of ammonium perchlorate. Since the solubility of sodium bicarbonate is greatly depressed by the presence of such amounts of dissolved sodium carbonate, particularly at higher temperatures, the separation of ammonium perchlorate from sodium bicarbonate by fractional crystallization is greatly facilitated.

Precipitation of solid ammonium perchlorate is brought about by cooling the aqueous mixture containing the ammonium perchlorate. The effect of cooling upon the solubility of ammonium perchlorate is illustrated by the $NH_4ClO_4$ curve in FIG. 2. From the slope of this curve, it is seen that the greater the temperature differential through which the aqueous mixture is cooled, the greater will be the quantity of solid ammonium perchlorate obtained. This process is not, however, limited to any temperature differential since a temperature drop of only one degree or less will produce a small amount of solid ammonium perchlorate and a temperature drop from the boiling point to the freezing point of the mixture will produce a large amount of solid ammonium perchlorate. In order to achieve an efficient operation, it is generally desired to cool the aqueous mixture through a temperature differential of from about 20° C. to 50° C. The process can be carried out at a constant temperature with the formation of solid ammonium perchlorate being caused by removal of a part of the water from a saturated mixture of ammonium perchlorate rather than by cooling the mixture.

The following examples are presented to further illustrate and not to limit the invention. All parts and percentages in the following example, throughout the specification and in the appended claims are by weight unless otherwise indicated.

EXAMPLE

This example is illustrative of the preparation and crystallization of ammonium perchlorate from an aqueous mixture containing ammonium perchlorate, sodium perchlorate, sodium carbonate and sodium bicarbonate.

The mother liquor from a previous batch is chosen as the reaction mixture. This mother liquor is initially at a temperature of 20° C. The mother liquor initially has the following composition:

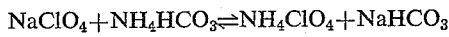

| Component: | Grams per 100 grams of $H_2O$ |
|---|---|
| $NH_4ClO_4$ (Point H in FIG. 2) | 25.4 |
| $NaHCO_3$ | 3.5 |
| $Na_2CO_3$ | 9.0 |
| $NaClO_4$ | 3.5 |
| $H_2O$ | 100.0 |
| Total | 141.4 |

This mother liquor is heated to a temperature of 60° C. (Point F in FIG. 2) and the following quantities of reactants then are added:

| | Grams per 100 grams $H_2O$ |
|---|---|
| $NaClO_4$ | 28.5 |
| $NH_3$ | 3.95 |
| $CO_2$ | 10.2 |

The $NaClO_4$ is added to the liquor in the form of a granular solid and agitated to promote the solution. The $NH_3$ gas and $CO_2$ gas are injected simultaneously into the liquor. During the reaction, 19.5 grams of sodium bicarbonate per each 100 grams of water are formed and crystallize out to form a slurry in the liquor. The solid sodium bicarbonate crystals are removed by centrifuging the slurry. After removal of the solid sodium bicarbonate crystals, the liquor contains 52.8 grams of ammonium perchlorate (Point G in FIG. 2), 5 grams of sodium bicarbonate, 9.0 grams of sodium carbonate and about 3.5 grams of sodium perchlorate per each 100 grams of water. This liquor is cooled to 20° C. to cause the crystallization of a crop of solid ammonium perchlorate. This cooling step causes the crystallization of 27.4 grams of $NH_4ClO_4$ per each 100 grams of water. Since the liquor is slightly supersaturated with respect to the sodium bicarbonate, essentially no solid sodium bicarbonate is present in the $NH_4ClO_4$ crystals.

After the solid $NH_4ClO_4$ has been separated out, the resulting liquor can be heated to 60° C., (Point F in FIG. 2) and utilized again as the reaction medium for the formation of more ammonium perchlorate. Sodium carbonate can be added to bring the concentration of this material up to the desired level if such addition is found necessary at any point in the cycle.

Using the mother liquor from one cycle to the next eliminates the necessity for adding the required amount of sodium carbonate each time ammonium perchlorate is produced. Even using recycle liquor for each reaction, it may be necessary to add make-up sodium carbonate to the liquor from time to time. Make-up sodium carbonate can be added to the reaction liquor in any form desired.

If desired, sodium carbonate can be formed by the use of excess ammonia as indicated in the following equation:

$$2NaClO_4 + 2NH_3 + CO_2 + H_2O \rightarrow 2NH_4ClO_4 + Na_2CO_3$$

Preferably, only stoichiometric amounts of carbon dioxide are used in carrying out the reaction, since the addition of more than the stoichiometric amount of carbon dioxide for the amount of ammonia present in the solution will tend to convert the sodium carbonate to sodium bicarbonate, thus resulting in the consumption of large quantities of sodium carbonate.

The temperatures at which the reactions of this invention are conducted is not critical, it only being necessary that the temperature does not drop below the freezing point of the mixture. If evaporative procedures are employed, at least a part of the process is preferably conducted with the mixture at its boiling point.

The maximum quantities of ammonium perchlorate and sodium carbonate in the reaction mixture are determined by their solubilities at a given temperature. While it is not critical, the most efficient operation is achieved by providing a reaction mixture which is at or about the saturation point with respect to ammonium perchlorate at an elevated temperature. The closer the reaction mixture is to this saturation point, the greater will be the yield of ammonium perchlorate crystals when the mixture is cooled. The ammonium perchlorate producing reaction does not depend on any particular concentration of reactants and will take place in very dilute or very concentrated solutions. An efficient operation is achieved if the reaction is accomplished at or about that concentration of reactants which will produce a mixture of products at the optimum concentration for separation by fractional crystallization. However, it is possible to carry out this reaction in a very dilute solution and concentrate the resultant aqueous ammonium perchlorate containing mixture to the point where solid ammonium perchlorate can be separated from the mixture by cooling.

While the specific quantity of ammonium perchlorate produced is dependent upon a number of factors, one very important factor is the concentration of this product in the mixture before it is cooled. If the mixture is saturated with ammonium perchlorate at 60° C., cooling the mixture to 40° C. will produce about 14 grams of product per 100 grams of water and additional cooling to 20° C. will produce an additional 14 grams of product per 100 grams of water. The application of evaporative techniques to the mixture will result in even higher yields.

The proportions of the reactants can vary considerably, but ordinarily approximately stoichiometric quantities of the reactants are employed since this is the most economical procedure. However, the proportions of the reactants can be varied from stoichiometric quantities by as much as ±10% or 15% or even more as desired. As noted above, the use of excess carbon dioxide will result in the consumption of sodium carbonate.

The process of the present invention does not depend for its success upon any specific apparatus arrangement. Any convenient apparatus can be employed and such conventional expedients as heating, cooling, and agitating are contemplated within the scope of the present invention. The sodium bicarbonate and ammonium perchlorate crystals can be separated from the liquor by conventional procedures such as settling and decantation, centrifuging and the like.

As will be understood by those skilled in the art, what has been described are the preferred embodiments of the inveniton. However, many modifications, changes, and substitutions can be made therein without departing from the scope and spirit of the invention as defined in the following claims.

What is claimed is:
1. Process for preparing ammonium perchlorate which includes the steps of:
   admixing and reacting sodium perchlorate, the equivalent of ammonium bicarbonate, water and from about 2 to 15 grams of sodium carbonate per each 100 grams of said water to form a mixture containing sodium bicarbonate and ammonium perchlorate; and
   recovering solid ammonium perchlorate which is substantially free of solid sodium bicarbonate.

2. Process for preparing ammonium perchlorate which includes the steps of:
   admixing and reacting sodium perchlorate, the equivalent of ammonium bicarbonate, water and from about 2 to 15 grams of sodium carbonate per each 100 grams of said water, to form an aqueous mixture of sodium bicarbonate and ammonium perchlorate;
   recovering solid ammonium perchlorate which is substantially free of solid sodium bicarbonate; and
   recycling the residual aqueous phase for use in preparing additional ammonium perchlorate.

3. Process for preparing ammonium perchlorate which includes the steps of:
   admixing and reacting sodium perchlorate, the equivalent of ammonium bicarbonate, water and from about 4 to 10 grams of sodium carbonate per each 100 grams of said water, to form an aqueous mixture containing sodium bicarbonate and ammonium perchlorate;
   separating solid sodium bicarbonate from said mixture;
   recovering solid ammonium perchlorate which is substantially free of solid sodium bicarbonate; and
   recycling the residual aqueous phase for use in preparing additional ammonium perchlorate.

4. Process for preparing ammonium perchlorate which includes the steps of:
   admixing the reacting sodium perchlorate, ammonia, carbon dioxide and water to from an aqueous mixture containing ammonium perchlorate and sodium bicarbonate;
   providing from about 2 to about 15 grams of sodium carbonate per each 100 grams of said water in said aqueous mixture; and
   recovering solid ammonium perchlorate which is substantially free of solid sodium bicarbonate.

5. Process for preparing ammonium perchlorate which includes the steps of:
   admixing and reacting sodium perchlorate, ammonia, carbonic acid and water to form an aqueous mixture containing ammonium perchlorate and sodium bicarbonate;
   providing from about 2 to about 15 grams of sodium carbonate per each 100 grams of said water in said aqueous mixture;
   recovering solid ammonium perchlorate which is substantially free of solid sodium bicarbonate; and
   recycling the residual aqueous phase for use in preparing additional ammonium perchlorate.

6. Process for preparing ammonium perchlorate which includes the steps of:
   admixing and reacting sodium perchlorate, the equivalent of ammonium bicarbonate and water to form an aqueous mixture containing sodium bicarbonate and ammonium perchlorate;
   providing from about 4 to about 10 grams of sodium carbonate per 100 grams of said water in said aqueous mixture;

separating solid sodium bicarbonate from said mixture while maintaining said mixture at an elevated temperature;
decreasing the temperature of said aqueous mixture; and recovering solid ammonium perchlorate which is substantially free of solid sodium bicarbonate.

7. Process for preparing ammonium perchlorate which includes the steps of:
   admixing and reacting sodium perchlorate, ammonia, carbon dioxide and water to form an aqueous mixture containing sodium bicarbonate and ammonium perchlorate;
   providing from about 4 to 10 grams of sodium carbonate per each 100 grams of said water in said aqueous mixture;
   maintaining said aqueous mixture at an elevated temperature;
   separating solid sodium bicarbonate from said aqueous mixture;
   decreasing the temperature of said aqueous mixture;
   recovering solid ammonium perchlorate which is substantially free of solid sodium bicarbonate; and
   recycling the residual aqueous phase for use in preparing additional ammonium perchlorate.

8. A process for preparing ammonium perchlorate which comprises:
   establishing an aqueous medium having a sodium carbonate concentration within the range of 2 to 15 weight percent;
   dissolving solid sodium perchlorate in said aqueous medium containing sodium carbonate;
   introducing simultaneous gaseous streams of ammonia and carbon dioxide into said aqueous medium to form an aqueous mixture containing sodium bicarbonate and ammonium perchlorate;
   maintaining said aqueous mixture at an elevated temperature to precipitate sodium bicarbonate therefrom;
   separating the solid sodium bicarbonate from said aqueous mixture;
   cooling said mixture to a temperature within the range of 20 to 50° to precipitate solid ammonium perchlorate;
   separating said solid ammonium perchlorate which is substantially free of solid sodium bicarbonate; and
   recycling the residual aqueous phase for use in preparing additional ammonium perchlorate.

References Cited by the Examiner
UNITED STATES PATENTS

| | | | |
|---|---|---|---|
| 1,453,984 | 5/1923 | Long | 23—85 |
| 3,105,735 | 10/1963 | Ayerst | 23—85 |

OSCAR R. VERTIZ, *Primary Examiner.*

MAURICE A. BRINDISI, OSCAR R. VERTIZ, MILTON WEISSMAN, *Examiners.*

E. STERN, *Assistant Examiner.*